United States Patent
Merovitz

(10) Patent No.: US 8,268,353 B2
(45) Date of Patent: Sep. 18, 2012

(54) POLYMER LATEX COMPOUND

(75) Inventor: Gerald Merovitz, Dover, DE (US)

(73) Assignee: Playtex Products, LLC, Shelton, CT (US)

( * ) Notice: Subject to any disclaimer, the term of this patent is extended or adjusted under 35 U.S.C. 154(b) by 0 days.

(21) Appl. No.: 13/076,571

(22) Filed: Mar. 31, 2011

(65) Prior Publication Data

US 2011/0173738 A1 Jul. 21, 2011

Related U.S. Application Data

(62) Division of application No. 12/189,352, filed on Aug. 11, 2008.

(60) Provisional application No. 60/964,096, filed on Aug. 9, 2007.

(51) Int. Cl.
*A41D 19/00* (2006.01)
*A61K 9/14* (2006.01)
*A01N 25/34* (2006.01)

(52) U.S. Cl. ........................ 424/485; 223/78; 424/402

(58) Field of Classification Search .................. None
See application file for complete search history.

(56) References Cited

U.S. PATENT DOCUMENTS 3,600,716 A * 8/1971 Berry .................. 2/167
2003/0005508 A1 * 1/2003 Hourihan et al. ............. 2/161.7

FOREIGN PATENT DOCUMENTS

| WO | 9924507 | 5/1999 |
| WO | 0190236 | 11/2001 |
| WO | WO 0190236 A1 * | 11/2001 |

OTHER PUBLICATIONS

International Search Report; International Application No. PCT/US2008/072761; Date Mailed Nov. 17, 2008.

* cited by examiner

*Primary Examiner* — Frederick Krass
*Assistant Examiner* — Isaac Shomer
(74) *Attorney, Agent, or Firm* — Michaud-Kinney Group LLP

(57) ABSTRACT

A polymer latex composition has an acrylonitrile component, a polychloroprene component, and a natural latex component. When these components are blended together and formed into a film, the film exhibits a resistance to ozone that is greater than a resistance to ozone of materials in which acrylonitrile is not included. Furthermore, the combination of acrylonitrile and chloroprene imparts a synergistic effect to the composition with regard to ozone resistance. The film can be formed into a glove having a resistance to ozone that is improved over the resistance to ozone of gloves not including acrylonitrile. The glove may include an antimicrobial agent.

6 Claims, 1 Drawing Sheet

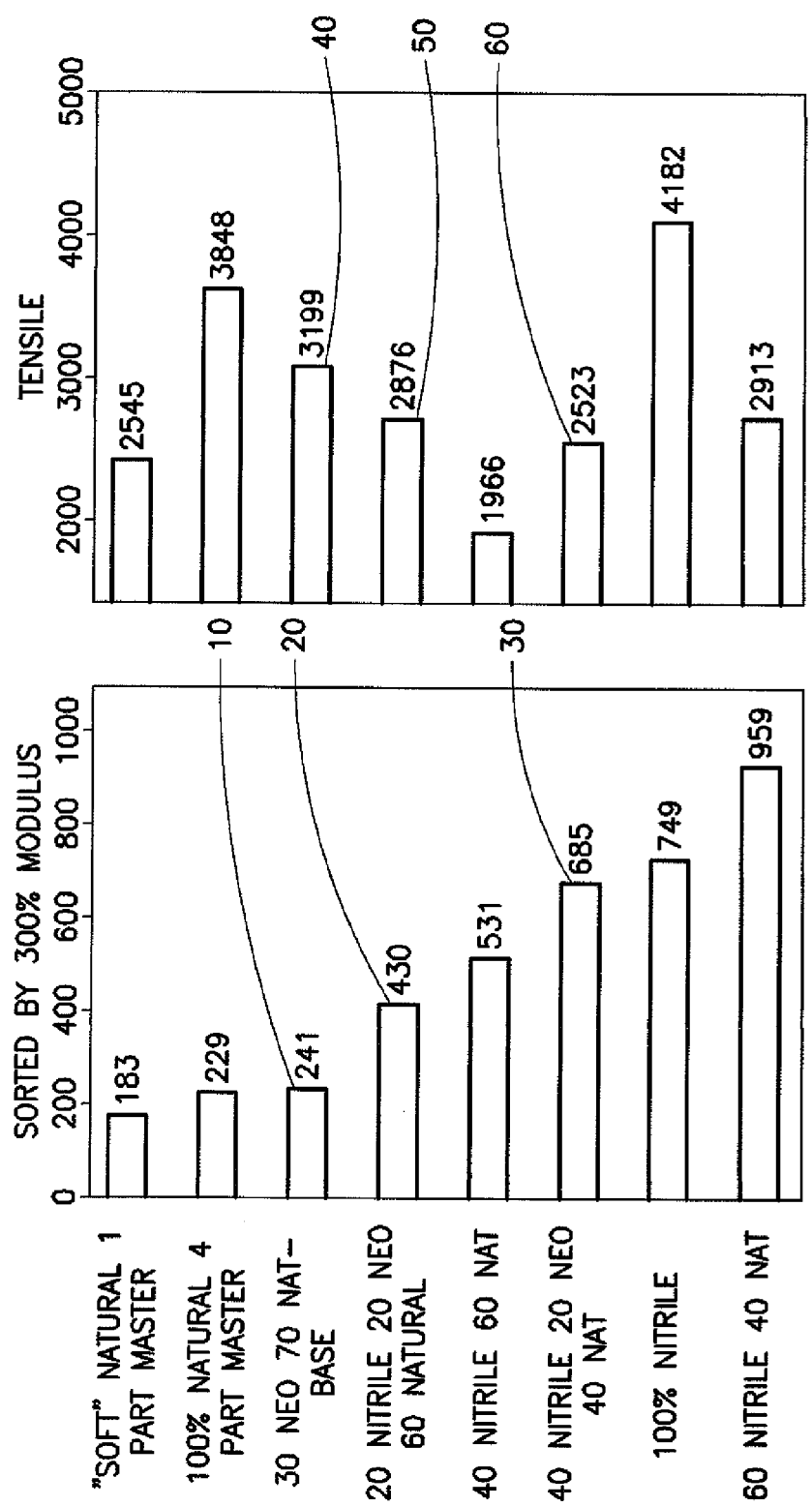

POLYMER LATEX COMPOUND

CROSS REFERENCE TO RELATED APPLICATION

This application is a divisional application of U.S. patent application Ser. No. 12/189,352, filed on Aug. 11, 2008, and which claims the benefit of U.S. Provisional Patent Application No. 60/964,096, filed on Aug. 9, 2007, the contents of which are incorporated herein by reference in their entirety.

TECHNICAL FIELD

This disclosure relates to polymer formulations for compounds having improved resistance to ozone and, more particularly, to ozone-resistant compounds incorporating multiple polymers that can be formed into rubber films for use in, for example, gloves, baby products, and the like.

BACKGROUND OF THE INVENTION

Latex is an aqueous suspension of hydrocarbon polymer. When the suspended hydrocarbon polymer is coagulated using an acid or (as is more commonly used) calcium nitrate, the coagulated material drops out of the aqueous phase as a solid. This solid can be of a single latex type, or it can be a combination of latex-type polymers. The hydrocarbon polymer(s) suspended in the aqueous phase can be selected to provide a specific formulated blend. When the latex is natural (derived from plant sources), a natural rubber product is produced. When the latex is synthetic (artificially produced using emulsion polymerization techniques), a synthetic rubber product is produced. For example, when chloroprene monomers (2-chloro-1,3-butadiene) are polymerized (reacted to link into a chain), the resulting product is known as polychloroprene or chloroprene rubber, more commonly known by the trade name Neoprene, which is available from DuPont Performance Elastomers L.L.C. of Wilmington, Del., USA.

Naturally-occurring ozone gas is corrosive to natural rubber and causes it to degrade, thereby compromising the integrity of devices in which natural rubber is a component. Some synthetic rubbers, on the other hand, exhibit a resistance to ozone that is superior in comparison to natural rubber. Unfortunately, many synthetic rubbers and most notably the highly ozone resistant chloroprene-based rubbers are currently significantly higher in cost than natural rubber. To increase ozone resistance to a rubber product, polychloroprene latex is blended with natural latex in the compound formulation stage at a blend ratio level to impart the ozone resistance of the polychloroprene to the overall material. The higher the polychloroprene ratio to natural latex, the higher ozone resistance will be.

To facilitate effective ozone resistance at a cost that is more reasonable given the cost of chloroprene rubber, rubber that is a mixture of chloroprene rubber and natural rubber has been derived. To produce a very minimal ozone-resistant compound, the chloroprene content is typically about 30% by weight (wt. %). This 30% chloroprene content is only marginally better than natural rubber alone. About 40% polychloroprene is needed to cause a substantial increase in ozone resistance to be realized. At 40%, there is a sufficient saturation of polychloroprene to cover the natural rubber particles and to provide suitable resistance to ozone degradation. The combination of natural rubber and chloroprene rubber at the proper ratio thus allows the benefits of both materials to be realized. More specifically, by blending the natural and chloroprene rubbers, ozone resistance from the polychloroprene is realized, and elasticity, strength, and tear resistance from the natural rubber is realized. However, the high cost of polychloroprene makes it a less than optimum material for use in rubber products, particularly at the levels currently used.

What is needed is a more cost-effective material that can be used in conjunction with polychloroprene to provide suitable ozone resistance to rubber.

SUMMARY OF THE INVENTION

This patent describes substitution of a portion of the costly polychloroprene with more cost-effective acrylonitrile latex to achieve equal or better ozone resistance than a low-ratio of polychloroprene to natural latex blend, thereby increasing the ozone resistance at a more favorable cost.

In one aspect, the present invention relates to a polymer latex composition having an acrylonitrile (2-propenenitrile) component, a polychloroprene component, and a natural latex component. When these components are blended together and formed into a film, the film exhibits a resistance to ozone that is improved over the resistance to ozone of materials in which acrylonitrile is not included. Furthermore, the combination of acrylonitrile and chloroprene imparts a synergistic effect to the composition with regard to ozone resistance. In particular, the ozone resistance realized by the combination of the acrylonitrile and chloroprene with the natural latex is greater than either of the acrylonitrile and polychloroprene individually in natural rubber.

In another aspect, the present invention relates to a glove fabricated from a film of polymer latex composition as described herein (e.g., about 20 wt. % acrylonitrile, about 20 wt. % polychloroprene, and about 60 wt. % natural latex). The glove has a resistance to ozone that is improved over the resistance to ozone of gloves not including acrylonitrile.

BRIEF DESCRIPTION OF THE DRAWINGS

The FIGURE is a graphical comparison of the tensile strength for a selected modulus of various samples.

DETAILED DESCRIPTION OF THE PREFERRED EMBODIMENTS

As used herein, the terms "acrylonitrile" and "nitrile" refer to butadiene acrylonitrile copolymer or nitrile butadiene rubber (NBR). The NBR used with regard to the present invention comprises carboxylated nitrile butadiene rubber.

As referred to herein, NBR is a family of unsaturated copolymers of 2-propenenitrile and various butadiene monomers (e.g., 1,2-butadiene and 1,3-butadiene) in which the acrylonitrile component is between about 20% and 50% and in which the butadiene component complements the acrylonitrile and is between about 80% and 50%. Although the physical and chemical properties of NBR vary depending on the polymer composition of the nitrile, it can be generally stated that more nitrile within the polymer will produce a material of lower flexibility (as compared to less nitrile in the polymer producing a material of greater flexibility). The carboxylation of the NBR provides carboxyl side groups that improve abrasion and wear resistance, ozone resistance, and low temperature flexibility as compared to non-carboxylated NBR.

The present invention utilizes a blend of acrylonitrile, polychloroprene, and natural latex to provide a rubber film having durability against the effects of ozone while allowing the rubber film to maintain a suitable elasticity and a lower modulus of elasticity. Durability against the effects of ozone while maintaining elasticity and modulus is not realized by the foregoing components individually or the combination of any two of the components. Additionally, the cost of acrylonitrile is much less than polychloroprene and approximately equal to the cost of natural latex.

The formulations of the present invention include acrylonitrile, polychloroprene, and natural latex in ratios of about 20/20/60, which are formulations having 20% acrylonitrile, 20% polychloroprene, and 60% natural latex. The percentages of each component of the formulation may be approximate. The formulations of the present invention, when blended, define polymers that are aqueous latex compounds. A latex compound of such a polymer is cross-linked using a sulfur vulcanization process to produce a rubber film. Using suitable manufacturing technology, the polymer is capable of being processed into gloves, baby products such as pacifiers, baglets, bottle nipples, and the like, and a myriad of other devices. Depending upon the particular device into which the aqueous latex compound is processed, the sulfur vulcanization process may be performed before, during, or after the formation of device.

In one embodiment of the present invention, a polymer comprising about 10 wt. % to about 30 wt. % acrylonitrile, about 10 wt. % to about 30 wt. % polychloroprene latex, and about 56 wt. % to about 64 wt. % natural latex is processed to provide one polymer formulation (20/20/60) of the present invention. Preferably, the acrylonitrile is about 18 wt. % to about 22 wt. % and the polychloroprene is about 18 wt. % to about 22 wt. %. The polymer formulation is based on the dry weight of each component. The acrylonitrile component may also include about 3 wt. % to about 7 wt. % of a stabilizer (e.g., a soap) and is adjusted with a suitable amount of potassium hydroxide or the like to cause the component (which is an aqueous solution) to be alkaline, preferably to a pH of about 10 to about 11. The natural latex component includes about 2% to about 15% of at least one curing agent, accelerator, and an antioxidant in the form of an aqueous dispersion. The curing agent dispersion may be a typical rubber cure system combination (e.g., zinc oxide, sulfur, a cure accelerator, and an antioxidant). The present invention is not limited in this regard, however, as other similar cure systems are within the scope of the present invention. Also, the final compound may include about 2% to about 5% of a coloring agent and additionally (and optionally) up to about 3% wax emulsion. This polymer formulation is not limited in this regard, as other materials and amounts are within the scope of the present invention.

The acrylonitrile component in conjunction with the polychloroprene facilitates the blending of the acrylonitrile with the natural latex. In particular, the combination of the acrylonitrile and the polychloroprene enhances the blending of the acrylonitrile/polychloroprene/natural latex compound due to the stability of the polychloroprene, thereby improving the stability of blending process as well as the pot life of the compound. On the other hand, various materials may also be added to allow the acrylonitrile, polychloroprene, and natural latex to blend together into a stable latex compound. For example, sodium alkyl sulfate, which is an anionic stabilizer for natural, synthetic, and polychloroprene latexes may be added. Also, a monosodium salt of sulfated methyl oleate may be added to, for example, improve the smoothness and gloss of the polychloroprene latex film and/or as a modifier for latex dipping compounds.

In another embodiment of the present invention, a glove comprises a polymer having about 10 wt. % to about 30 wt. % acrylonitrile, about 10 wt. % to about 30 wt. % polychloroprene latex, and about 56 wt. % to about 64 wt. % natural latex. Preferably, the acrylonitrile is about 18 wt. % to about 22 wt. % and the polychloroprene is about 18 wt. % to about 22 wt. %. Again, the polymer formulation is based on the dry weight of each component. The acrylonitrile can include about 3 wt. % to about 7 wt. % stabilizer (e.g., a soap) and can be adjusted with a suitable base to bring the acrylonitrile into the alkaline range, preferably to a pH of about 10 to about 11. The natural latex component includes about 2% to about 15% of at least one curing agent, accelerator, and an antioxidant in the form of an aqueous dispersion. Colorants may be used to impart color to the finished glove product (typically about 2% to about 5%). Additionally, up to about 3% wax emulsion can also be added. The glove can be formed using any suitable technique (e.g., blow molding, casting, or the like).

An antimicrobial agent may be incorporated into the glove. One particular antimicrobial agent that can be used is Ultra Fresh 15, which is a 15% active, water-based dispersion of diiodomethyl-p-tolylsulfone available from Thomson Research Associates of Toronto, Canada. The Ultra Fresh 15 (or any other antimicrobial agent) is added as a dispersion to the glove material from which the glove is made. The present invention is not limited to the use of Ultra Fresh 15, however, as other antimicrobial agents are within the scope of the present invention.

The dispersion is incorporated into the polymer material used to manufacture the glove by mixing of the dispersion into the liquid latex or latex/polychloroprene mixture. The latex or latex/polychloroprene mixture is itself an aqueous dispersion so the antimicrobial agent is readily accepted and dispersed evenly throughout the compound.

In addition, the combination of the antimicrobial agent with other active materials can be suspended in a similar way and added to the latex or latex/polychloroprene matrix. Other suitable materials that could be added include, for example, triclosan, fluorescent material, silver salt, biguanide, chlorohexidene salt, dextran sulfate, quaternary ammonium salt, benzalkonium, acriflavine, acridine dye, gentian violet, mercurochrome, extract of blue green algae, or any mixtures thereof. The present invention is not so limited, however, as other materials may be added.

Example 1

Formulation of Tripolymer Concept Used for Initial Testing

The formulation indicated below was used for initial testing of the polymer incorporating acrylonitrile, polychloroprene, and natural latex. The resulting compound was used as the 20/20/60 composition in subsequent Examples.

| Material | ppH | % Active | Wet weight | % water cut | Dry wt. (lbs.) | Wet wt. (lbs.) |
|---|---|---|---|---|---|---|
| Nitrile | 20.00 | 43.9 | 45.558 | | 0.53 | 1.2 |
| Sodium alkyl sulfate (water) | 0.25 | 33.0 | 0.758 | 33 | 0.01 | 0.02 |
| | | | | | | 0.04 |
| Monosodium sulfated methyl oleate salt (water) | 0.25 | 33.0 | 0.758 | 33 | 0.01 | 0.02 |
| | | | | | | 0.04 |
| Wax emulsion | 1.000 | 54.0 | 1.852 | | 0.03 | 0.05 |
| KOH | 0.500 | 10.0 | 5.000 | | 0.01 | 0.13 |
| Chloroprene | 20.00 | 50.0 | 40.00 | | 0.53 | 1.05 |
| Natural latex | 60.00 | 60.0 | 100.0 | | 1.58 | 2.63 |
| ZnO dispersion | 3.00 | 50.0 | 6.000 | | 0.08 | 0.16 |
| Vulcanization | 4.30 | 54.0 | 7.963 | | 0.11 | 0.21 |

-continued

| Material | ppH | % Active | Wet weight | % water cut | Dry wt. (lbs.) | Wet wt. (lbs.) |
|---|---|---|---|---|---|---|
| and Antioxidant dispersions | | | | | | |
| Colorant | 0.20 | 50.0 | 0.400 | | 0.01 | 0.01 |
| Sub-total | 109.5 | | 208.5 | | 2.88 | 5.57 |
| Ultrafresh 15 | | | | | 0.5 grams | |
| Water adjustment | | | | | | 0.84 |
| TOTAL | 109.5 | | 208.5 | | 2.88 | 6.41 |

The nitrile used was Reichhold 68073 Nitrile, available from Dow Reichhold Specialty Latex LLC of Research Triangle Park, North Carolina, USA.

Example 2

Tensile Results of Films Based on Polymer Formulations

Various formulations of acrylonitrile/chloroprene/natural latex were tested to determine the tensile strength of films thereof.

TABLE 1

Summary of tensile testing results

| Sample | Composition* | Gauge | 100% | 200% | 300% | 400% | 500% | 600% | 700% | Tensile | Elongation (%) |
|---|---|---|---|---|---|---|---|---|---|---|---|
| 1 | 0/30/70 | 0.0141 | 147 | 191 | 241 | 314 | 499 | 902 | 1574 | 3199 | 864 |
| 2 | 20/20/60 | 0.0132 | 198 | 287 | 430 | 752 | 1353 | 2179 | 2832 | 2876 | 678 |
| 3 | 40/20/40 | 0.0133 | 285 | 437 | 685 | 1266 | 1774 | | | 2523 | 511 |

*wt. % acrylonitrile/wt. % chloroprene/wt. % natural latex

In the above Table 1, Sample 1 served as a control (no acrylonitrile). Gauge indicates the thickness of films.

Referring to the FIGURE, a comparison of the tensile strength for the 300% modulus of each sample is made. The 300% modulus of Sample 1, as shown at 10, was substantially less than the 300% modulus of Sample 2, as shown at 20. Both were less than the 300% modulus of Sample 3, shown at 30. A tensile strength value 50 of Sample 2, however, is substantially in line with a tensile strength value 40 of Sample 1 but substantially greater than a tensile strength value 60 of Sample 3. This indicates that an optimum amount of acrylonitrile occurs between 20 wt. % and 40 wt. %.

Example 3

Effects of Ozone on Films Based on Polymer Formulations

Sample discs of material were folded twice to generate a stress point. The sample discs were then placed into an ozone chamber operating at 25-35 pphm ozone concentration. The samples were checked after every hour and assigned a value (0-4 in 0.5 increments) based on the degree of wear of the sample. An assigned value of 0 indicated that the sample experienced some whitening, but no cracks and no damage was visible; a value of 1 indicated that small microscopic cracks were visible under magnification, but the material was still usable; a value of 2 indicated that cracks were visible to the naked eye and about one half of the film depth; a value of 3 indicated that deep cracks were visible, but the material was still usable although weakened; and a value of 4 indicated that the film was split or splitting was imminent upon elongation. After 21 hours, a summation of all values was taken.

TABLE 2

| Samples | | |
|---|---|---|
| Sample | Composition* | Sum |
| 1 | 0/30/70 | 68 |
| 2 | 20/20/60 | 23.5 |
| 3 | 40/20/40 | 30.5 |
| 4 | 0/0/100 | 34 |

*wt. % acrylonitrile/wt. % polychloroprene/wt. % natural latex

From the above data, it can be seen that Sample 2 outperformed Sample 1 and Sample 4.

Example 4

Effects of Ozone on Stretched Films Based on Polymer Formulations

Rubber films (plates) were prepared from a variety of formulations differing in acrylonitrile, chloroprene, and natural rubber latex ratios. Samples one inch wide were cut from the plates, elongated 50%, and stapled to cardboard mounts. The samples were placed in an ozone chamber and observed at 5, 10, 13, and 19 hours.

TABLE 3

| Samples | |
|---|---|
| Sample | Composition |
| 1 | 20/20/60 |
| 2 | 0/30/70 |
| 4 | 0/0/100 |
| 5 | 40/0/60 |

*wt. % acrylonitrile/wt. % chloroprene/wt. % natural latex

The Samples were monitored and assessed for cracking, pitting, and other surface damage. Samples 2 and 4 were completely destroyed by 13 hours, whereas Samples 1 and 5 showed no damage at the end of the same 13 hour period. At 19 hours, Sample 1 showed some whitening but no damage, and Sample 5 showed minor surface fissures, some curling, and whitening. It was concluded that Sample 1 definitively outperformed Samples 2 and 4.

Similar testing at longer periods of time indicated that Sample 1 may compete with samples having even higher chloroprene levels (e.g., 60% chloroprene and 40% natural latex).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

I claim:

1. A glove fabricated from a polymer latex composition comprising:
   about 18 wt. % to about 22 wt. % polyacrylonitrile;
   about 18 wt. % to about 22 wt. % polychloroprene; and
   about 56 wt. % to about 64 wt. % natural rubber latex;
   wherein said polyacrylonitrile, polychloroprene and natural rubber latex are blended together and formable into a film having a resistance to ozone that is greater than a resistance to ozone of a composition without said polyacrylonitrile;
   wherein said film is formed into the shape of the glove; and
   wherein said wt. % is based on a total weight of said polymer latex composition.

2. The glove of claim 1, wherein said film is formed into the shape of the glove by a casting process.

3. The glove of claim 1, further comprising about 3 wt. % to about 7 wt. % of a stabilizing agent.

4. The glove of claim 1, further comprising an antimicrobial agent.

5. The glove of claim 4, wherein said antimicrobial agent is diiodomethyl-p-tolylsuflone.

6. The glove of claim 4, wherein said antimicrobial agent is selected from the group consisting of triclosan, fluorescent material, silver salt, biguanide, chlorohexidene salt, dextran sulfate, quaternary ammonium salt, benzalkonium, acriflavine, acridine dye, gentian violet, mercurochrome, extract of blue green algae, and mixtures thereof.

* * * * *